United States Patent [19]

Yasuno et al.

[11] 4,250,007
[45] Feb. 10, 1981

[54] PHOTOCURABLE ACRYLIC PHOSPHATE ESTERS OF EPOXIDIZED POLYBUTADIENE

[75] Inventors: Hiroshi Yasuno; Toshimune Yoshinaga, both of Ichihara; Tsunetomo Nakano, Chiba, all of Japan

[73] Assignee: Ube Industries, Ltd., Yamaguchi, Japan

[21] Appl. No.: 20,496

[22] Filed: Mar. 14, 1979

[30] Foreign Application Priority Data

Mar. 17, 1978 [JP] Japan .................................. 53-29838

[51] Int. Cl.³ .................. C08F 230/02; C08F 279/02; C08J 3/28
[52] U.S. Cl. .................. 204/159.23; 204/159.22; 525/167; 525/171; 525/922; 526/277
[58] Field of Search .................. 525/530, 531, 922; 204/159.15, 159.16, 159.19, 159.23, 159.24; 526/277

[56] References Cited

U.S. PATENT DOCUMENTS

| | | | |
|---|---|---|---|
| 3,291,781 | 12/1966 | Robertson | 526/277 |
| 3,367,992 | 2/1968 | Bearden | 525/518 |
| 3,674,545 | 7/1972 | Strolle | 525/922 X |
| 3,770,602 | 11/1973 | D'Alelio | 204/159.15 |
| 3,847,846 | 11/1974 | Asada | 526/277 |
| 3,855,364 | 12/1974 | Steckler | 526/277 |
| 3,884,864 | 5/1975 | Matsuda et al. | 526/277 |
| 3,888,844 | 6/1975 | D'Alelio | 526/277 |
| 4,146,452 | 3/1979 | Weber et al. | 204/159.14 |

*Primary Examiner*—John C. Bleutge
*Assistant Examiner*—A. H. Koeckert

[57] ABSTRACT

A photosetting composition useful as a coating varnish comprising a modified, epoxidized butadiene polymer, at least one photopolymerizable monomer and a photosensitizer, the modified, epoxidized butadiene polymer comprising (1) an epoxidized butadiene polymer backbone group, (2) 5 to 50 aromatic or cyclocyclic polybasic carboxylic ester side chain groups per 100 butadiene units, each having at least one acryloyl or methacryloyl terminal group and a linking group formed by a reaction between a carboxylic acid radical in the polybasic carboxylic ester and an epoxy radical in the epoxidized butadiene polymer and, optionally, (3) 0 to 50 phosphoric ester additional side chain groups per 100 butadiene units, each having a linking group formed by a reaction between a hydroxyl radical attached to a P atom in the phosphoric ester and an epoxy radical in the epoxidized butadiene polymer.

12 Claims, No Drawings

PHOTOCURABLE ACRYLIC PHOSPHATE ESTERS OF EPOXIDIZED POLYBUTADIENE

FIELD OF THE INVENTION

The present invention relates to a photosetting composition. More particularly, the present invention relates to a photosetting composition which is capable of being cured by exposure to actinic rays, such as ultraviolet rays, and which is useful as a coating varnish for metal and synthetic resin articles.

BACKGROUND OF THE INVENTION

It is known that a metal or synthetic resin article can be coated with a thermosetting resin by a process in which a solution of the resin in a solvent is applied onto a surface of the article, the applied resin solution layer is dried and, then, the dried resin layer is cured at an elevated temperature. The above-mentioned conventional thermosetting process is disadvantageous in that a large scale drying and curing apparatus must be used in order to evaporate the solvent from the resin solution layer and thermally cure the dried resin layer, that the solvent vapor generated in the drying and curing apparatus may pollute the atmosphere, and that a large amount of thermal energy is consumed for evaporating the solvent and for curing the resin layer.

In order to eliminate the above-mentioned disadvantages of the thermosetting process, a photosetting process was proposed. In the photosetting process, a liquid photosetting composition is applied onto a surface of the article and the applied photosetting composition layer is cured by the action of actinic rays, such as ultraviolet rays. The conventional photosetting composition contains, for example, an epoxy resin or a liquid polybutadien as a base component. However, the conventional epoxy resin type photosetting composition is disadvantageous in such features that the stability of the composition during storage is poor, that the photocuring reaction rate of the composition is low, that the adhering property of the composition to the article surface to be coated is poor, and that the resultant photocured composition exhibits a poor flexural strength and impact strength. On the other hand, the conventional liquid polybutadiene type photosetting composition exhibits a poor photosetting rate and adhering property, and the resultant photocured composition exhibits a poor hardness. Accordingly, neither the conventional epoxy resin type nor liquid polybutadiene type photosetting composition is proper as a coating varnish.

Japanese Patent Application Laying-Open Nos. 48-29886(1973) 49-98454(1974) and 51-37128(1976) disclose photosetting compositions containing, as a base component, an epoxidized polybutadiene or modified, epoxidized polybutadiene which exhibits both the properties of the epoxy resin and the liquid polybutadiene. However, these types of photosetting compositions still have the above-mentioned disadvantages of the conventional epoxy resin type and liquid polybutadiene type photosetting compositions. That is, these types of the photosetting composition have a poor storing stability, photocuring reaction rate and adhering property. Also, the resultant photocured composition exhibits a poor hardness and resistance to water.

Japanese Patent Application Laying-Open No. 51-37128(1976) discloses a photosetting composition containing, as a base component, another type of modified epoxidized polybutadiene which is prepared by reacting an epoxidized polybutadiene with acrylic or methacrylic acid, a photopolymerizable monomer and a photosensitizer. However, this photosetting composition has a relatively poor photocuring reaction rate and, therefore, a long time required to complete the photocuring reaction. Accordingly, this type of photosetting composition is unsuitable for practical use.

SUMMARY OF THE INVENTION

An object of the present invention is to provide a photosetting composition having an excellent storing stability, photocuring reaction rate and adhering property.

Another object of the present invention is to provide a photosetting composition capable of being converted into a photocured composition having high flexural and impact strengths, a high hardness and an excellent resistance to water. A further object of the present invention is to provide a photosetting composition which is useful as a coating varnish for metallic and synthetic resin articles.

The above-mentioned objects can be attained by the photosetting composition of the present invention which comprises:

(A) 100 parts by weight of a modified, epoxidized butadiene polymer which comprises (1) a backbone group consisting of a residue of an epoxidized butadiene polymer, (2) 5 to 50 side chain groups per 100 butadiene units in said backbone group, each of which consists of a residue of a member selected from aromatic and cycloaliphatic polybasic carboxylic esters, each having at least one terminal group consisting of a member selected from the class consisting of acryloyl and methacryloyl radicals and each of which is attached to said backbone group through a linking group formed by an esterifying reaction between a carboxylic acid radical in said polybasic carboxylic ester and an epoxy radical in said epoxidized butadiene polymer, and (3) 0 to 50 additional side chain groups per 100 butadiene units in said backbone group, each of which consists of a residue of an acid phosphoric ester compound and is attached to said backbone group through a linking group formed by an esterifying reaction between a hydroxyl(-OH) group attached to a phosphorus atom in said acid phosphoric ester compound and an epoxy radical in said epoxidized butadiene polymer;

(B) 30 to 800 parts by weight of at least one photopolymerizable monomer, and;

(C) 0.5 to 15 parts by weight of a photosensitizer.

DETAILED DESCRIPTION OF THE INVENTION

The photosetting composition of the present invention contains, as an important component, a special modified, epoxidized butadiene polymer which comprises (1) a backbone group consisting of a residue of an epoxidized butadiene polymer, (2) 5 to 50 side chain groups per 100 butadiene units in the backbone group, each consisting of a residue of a special acid aromatic or cycloaliphatic polybasic carboxylic ester compound and attached to the backbone group, and (3) 0 to 50 additional side chain groups per 100 butadiene units in the backbone group, each consisting of a residue of a special acid phosphoric ester compound and attached to the backbone group.

The polybasic carboxylic ester side chain group has at least one terminal group consisting of a member selected from the class consisting of acryloyl and methacryloyl radicals and a linking group through which the polybasic carboxylic ester side chain group is attached to the carboxylic ester side chain group is attached to the backbone group and which has been formed by an esterifying reaction between a carboxylic acid radical in the polybasic carboxylic ester compound and an epoxy radical in the epoxidized butadiene polymer. The acid phosphoric ester additional side chain group has a linking group which has been formed by an esterifying reaction between a hydroxyl(—OH) group attached to a phosphorus atom in the acid phosphoric ester compound and an epoxy radical in the epoxidized butadiene polymer so as to attach the additional side chain group to the backbone group.

The modified, epoxidized butadiene polymer can be prepared by epoxidizing a liquid butadiene polymer, and by modifying the epoxidized butadiene polymer with the special acid polybasic carboxylic ester compound and, optionally, with the special acid phosphoric ester compound.

In the preparation of the epoxidized butadiene polymer, it is preferable that the liquid butadiene polymer have a number average molecular weight of from 500 to 5,000, more preferably, from 600 to 3,000. Also, it is preferable that the liquid butadiene polymer have a viscosity of from 20 to 10,000 cps, more preferably, from 30 to 5000 cps, determined at a temperature of 30° C. by using a rotation viscometer. The molecular structure of the liquid butadiene polymer is not limited to a special structure. However, it is preferable that 40% or more of the butadiene units in the liquid butadiene polymer have a 1,4-structure. The liquid butadiene polymer may be selected from the class consisting of butadiene homopolymers and copolymers. The butadiene copolymer preferably comprises 70% or more butadiene and the balance consisting of one or more comonomer. The comonomer which can be copolymerized with butadiene, may be selected from the group consisting of acrylonitrile, styrene, acrylic esters, methacrylic esters, vinyl acetate, isoprene, 1,3-pentadiene and meleic anhydride.

The liquid butadiene polymer may have a terminal group consisting of a hydroxyl, carboxyl and other functional radicals.

If the rotation viscosity and the number average molecular weight of the liquid butadiene polymer are smaller than 20 cps and 500, respectively, the resultant photosetting composition may sometimes exhibit a low photocuring reaction rate. Also, if the rotation viscosity and the number average molecular weight of the liquid butadiene polymer are larger than 10,000 cps and 5,000, respectively, the resultant photosetting composition may sometimes have such an excessively large viscosity that the composition exhibits a poor coating processability.

The epoxidation of the liquid butadiene polymer can be effected by any processes. However, it is preferable that the epoxidation be carried out to an extent that the resultant epoxidized butadiene polymer has at least 7, more preferably, from 10 to 80, and even more preferably, from 12 to 60, of epoxy radicals per 100 butadiene units therein.

The liquid butadiene polymer may be epoxidized, for example, by reacting it with hydrogen peroxide and formic acid in an organic medium at a temperature of from 30° C. to 40° C. for several hours. In this epoxidation procedure, it is preferable that the molar ratio of hydrogen peroxide to formic acid used be in a range of from 1 to 10, more preferably, 2 to 6. Also, the ratio in weight of the hydrogen peroxide to the liquid butadiene polymer used is preferably in a range of from about 2 to about 5.

In another epoxidation process, the method disclosed by Charles E. Fielock in "Industrial Engineering Chemistry", vol. 50. No. 3, page 299(1958) may be used. In this method, the liquid butadiene polymer reacts with peracetic acid in an organic medium at a temperature of about 50° C. for about 5 hours in the presence of sodium acetate.

In every epoxidation process, after the epoxidation reaction is completed, the reaction mixture is washed with water so as to remove non-reacted hydrogen peroxide or peracetic acid and, then, the resultant epoxidized butadiene polymer is isolated from the washed reaction mixture by distilling away the organic medium.

The epoxidized butadiene polymer is modified with at least one member selected from the special acid aromatic and cycloaliphatic polybasic carboxylic ester compounds. The modifying compound has at least one terminal group consisting of an acryloyl or methacryloyl radical, and at least one free carboxylic acid radical. That is, the acid polybasic carboxylic ester compounds may be one of the formula (I):

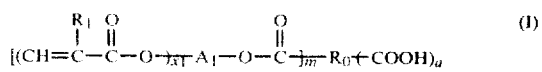

wherein $R_1$ represents a hydrogen atom or a methyl radical, $A_1$ represents a residue of a polyol compound, for example, diol and polyhydric alcohol compounds, which residue is exclusive of the number $(x_1+1)$ of hydroxyl radicals, $R_0$ represents a residue of an aromatic or cycloaliphatic polybasic carbocylic acid, exclusive of the number $(m+a)$ of carboxyl radicals, the subscripts $X_1$, is a positive number of from 1 to 3, the subscript m is a positive number of from 1 to 3 and the subscript a is a positive number of from 1 to 3. The acid polybasic carboxylic ester compounds usable for the present invention can be prepared by the single step reaction of an ester compound selected from the class consisting of acrylate and methacrylate compounds each having a hydroxyalkyl radical containing 2 to 16 carbon atoms, with a polybasic carboxylic anhydride compound selected from the class consisting of substituted and unsubstituted aromatic and cycloaliphatic polybasic carboxylic acid anhydrides.

Otherwise, the acid polybasic carboxylic ester compounds usable for the present invention can be prepared by the two-step reaction method wherein, first, an intermediate acid ester compound having at least one free carboxylic acid radical is prepared by reacting an aromatic or cycloaliphatic polybasic carboxylic acid with a polyol compound and, then, an acid polybasic carboxylic ester compound is prepared by reacting the above-resultant intermediate acid ester compound with an acrylic acid or methacrylic acid.

In either of the above-mentioned single and two-step reaction methods, the polybasic carboxylic acid is selected from the group consisting of unsubstituted and substituted aromatic and cycloaliphatic polybasic carboxylic acids having at least two carboxyl radicals, preferably, 2 to 5 carboxyl radicals, and the corresponding carboxylic anhydrides having at least one intermolecular acid anhydride radical.

The aromatic polybasic carboxylic acid and anhydride may be selected from the class consisting of unsubstituted phthalic acid compounds and substituted phthalic acid compounds, for example, halogen-substituted, alkoxyl-substituted, hydroxyl-substituted, alkyl-substituted, alkylthio-substituted and nitro-substituted phthalic acids and anhydrides thereof; trimellitic anhydride, pyromellitic dihydride; biphenyl polybasic carboxylic acid compounds, for example, 2,3,3',4',-biphenyl tetracarboxylic acid, 3,3',4,4'-biphenyl tetracarboxylic acid, and mono and di esters and anhydrides of the above-mentioned compounds, and; polybasic carboxylic acid compounds having two henzene nuclei bonded to each other by a —CO—, —CH$_2$—, —O— or —S—bond, for example, 2,3,3',4'-benzophenone tetracarboxylic acid, 3,3',4,4'-benzophenonetetracarboxylic acid, bis(3,4-dicarboxyphenyl) methane, bis(3,4-dicarboxyphenyl) ether, bis(3,4-dicarboxyphenyl) thioether, mono and di, esters and acid anhydrides of the above-mentioned compounds.

The unsubstituted and substituted phthalic acid compound may be selected from the class consisting of phthalic anhydride, 3-chlorophthalic acid, 3,6-dichlorophthalic anhydride, 4-chlorophthalic anhydride, 4,5-dichlorophthalic anhydride, tetrachlorophthalic anhydride, 3-fluorophthalic anhydride, 3,6-difluorophthalic anhydride, 3-iodophilatic anhydride, 3,6-diidophthalic anhydride, 4-iodophthalic anhydride, 4,5-diiodophthalic anhydride, tetraiodophthalic anhydride, 3-bromophthalic anhydride, 3,6-dibromophthalic anhydride, 4-bromophthalic anhydride, 4,5-dibromophthalic anhydride, tetrabromophthalic anhydride, 4-fluorophthalic anhydride, 4,5-difluorophthalic anhydride; 3,4-dimethoxyphthalic anhydride, 3,6-dimethoxyphthalic anhydride, 4,5-dimethoxyphthalic anhydride; 3-(dibromomethyl)phthalic, 3-ethyl-6-(ethylthio) phthalic anhydride, 3-(ethylthio) phthalic anhydride, 3,5-dimethoxy-4-methylphthalic anhydride, 4,6-dimethoxy-3-methylphthalic anhydride, 3,6-dihydroxyphthalic anhydride, 3,6-dihydroxy-4-methylphthalic anhydride, 3,6-dimethoxy-4,5-methylene dihydroxyphthalic anhydride, 3,4-dimethylphthalic anhydride, 3,6-dimethylphthalic anhydride, 4,5-dimethylphthalic anhydride, 3-methylphthalic anhydride, 4-methylphthalic anhydride; 3-methoxyphthalic anhydride, 4-methoxyphthalic anhydride, 3-methoxy-4,6-dimethylphthalic anhydride, 4-isopropyl-3,5,6-trimethoxyphthalic anhydride, 4-hydroxyphthalic anhydride, 3-hydroxy-4,6-dimethylphthalic anhydride, 3-(ethylthio)-6-methylphthalic anhydride, 3-hydroxy-4-methoxyphthalic anhydride, 3-hydroxy-5-methoxyphthalic anhydride, 6-hydroxy-4methoxy-3-methylphthalic anhydride, 6-isobutyl-3,4-dimethylphthalic anhydride, 3-methyl-5-(phenylthio)phthalic anhydride, 3-(methylthio)phthalic anhydride, 3-nitrophthalic anhydride, 4-nitrophthalic anhydride, 3-(phenylthio)phthalic anhydride, 3-propylphthalic anhydride and 3-(propylthio)phthalic anhydride.

The cycloaliphatic polybasic carboxylic acid compound usable for the present invention may be selected from the class consisting of methyl-3,6-endomethylene tetrahydrophthalic anhydride, 3,6-endomethylene tetrahydrophthalic anhydride, tetrahydrophthalic anhydride, hexahydrophthalic anhydride and chlorendic anhydride.

The more preferable polybasic carboxylic acid compounds for forming the group Ro in the formula (I) are phthalic anhydride, trimellitic anhydride, pyromellitic anhydride, 2,3,3',4'-biphenyl tetracarboxylic dianhydride, 3,3'4,4'-biphenyl tetracarboxylic dianhydride, 3,3',4,4'-benzophenone tetracarboxylic dianhydride, bis(3,4-dicarboxyphenyl) ether dianhydride, bis(3,4-dicarboxyphenyl) methane dianhydride, methyl-3,6-endomethylene tetrahydrophthalic anhydride, 3,6-endomethylene tetrahydrophthalic anhydride, and tetrahydrophthalic anhydride.

In the single step reaction method for producing the acid polybasic carboxylic ester compounds, the acrylate or methacrylate compounds having a hydroxyalkyl radical may be prepared by esterifying a polyol compounds, for example, diol compounds and polyhydric alcohol compounds, with acrylic or methacrylic acid. The acrylate and methacrylate compounds having a hydroxyalkyl radical may be selected from the group consisting of 2-hydroxyethyl acrylate, 2-hydroxyethyl methacrylate, 2-hydroxypropyl acrylate, 2-hydroxypropyl methacrylate, polyethylene glycol monoacrylate, polyethylene glycol monomethacrylate, polypropylene glycol monoacrylate, polypropylene glycol mono-methacrylate, pentaerythritol triacrylate, glycerol diacrylate and glycerol monoacrylate.

In the first step in the two-step reaction method for producing the acid polybasic carboxylic ester compounds, the polyol compounds can be selected from the class consisting of glycol compounds, for example, ethylene glycol, propylene glycol, diethylene glycol dipropylene glycol, triethylene glycol, tripropylene glycol, tetraethylene glycol and tetrapropylene glycol; polyester compounds having two hydroxyalkyl terminal groups, which compounds are esterification products of dicarboxylic acid compounds, for example, phthalic anhydride, maleic anhydride, malonic acid and succinic acid with an excessive molar amount of glycol compounds, for example, ethylene glycol, propylene glycol, diethylene glycol, dipropylene glycol and triethylene glycol, or alkylene oxides, for example, ethylene oxide and propylene oxide; polybasic alcohol compounds, for example, glycerol, polyglycerol and pentaerythritol.

In a preferable example of the preparation of the acid polybasic carboxylic ester compounds by the single-step reaction method, one molar part of an aromatic or cycloaliphatic polybasic carboxylic anhydride is esterified with 2 molar parts or more, preferably, 2.5 to 6 molar parts of an acrylate or methacrylate having a hydroxyalkyl radical, in an organic medium or without using medium, in the presence of an esterification catalyst consisting of at least one organic quaternary ammonium salt selected from triethylbenzyl ammonium chloride, methyltriethyl ammonium chloride, tetraethyl ammonium chloride, methyltriethyl ammonium iodide, at a temperature of from 70° to 100° C., for 2 to 10 hours. In the above-mentioned example of the single step reaction method, the reaction mixture may contain a small amount of any known stabilizer for thermal polymerization, for example, hydroquinone, 2,6-di-tert-butyl-p-cresol, and p-benzoquinone. In the case where the acrylate or methacrylate compound having a hydroxyalkyl radical is used in a very excessive molar amount than the molar amount of the polybasic carboxylic anhydride compound used, in the single step reaction method, the acrylate or methacrylate compound serves as an organic medium for the esterification reaction. After the esterification reaction is completed, the non-reacted acrylate or methacrylate compound serves as an organic medium for the esterification reaction between the epoxidized butadiene polymer and the acid polybasic carboxylic ester compound. Furthermore, after the completion of the esterification reaction, the remaining acrylate or methacrylate compound may be used as a polymerizable monomer component in the resultant photosetting composition. Accordingly, after the esterification of the polyol compound with the polybasic carboxylic anhydride is completed, the remaining amount of non-reacted acrylate or methacrylate is not required to be removed from the resultant reaction mixture.

The photopolymerizable monomer usable for the photosetting composition of the present invention, may be used as an organic solvent for both the single step reaction and the esterification of the epoxidized butadiene polymer with the acid polybasic carboxylic ester compound.

The completion of the reaction in the single step reaction method can be determined by measuring the infra-red ray absorption spectrum in ranges of frequencies of from 1760 to 1780 $cm^{-1}$ and from 1840 to 1860 $cm^{-1}$ in which the intermolecular acid anhydride radical exhibits absorption peaks. When the single step reaction is completed, no peak in the spectrum is found.

In a preferable example of the two step reaction method for preparing the acid polybasic carboxylic ester compound, one molar part of an aromatic or cycloaliphatic polybasic carboxylic anhydride compound is reacted with 5 to 30 molar parts, preferably, 10 to 25 molar parts of a polyol compound in an organic medium or without using a medium, at a temperature of from 150° to 200° C., preferably, from 170° to 190° C. for from 1 to 10 hours, preferably, from 2 to 7 hours, in the presence of a catalyst, to prepare an intermediate ester compound having 1 to 3 carboxyl acid radicals, and then, one molar part of the intermediate ester compound is brought into reaction with 3 to 30, preferably, 5 to 15, molar parts of acrylic acid or methacrylic acid, in the presence of a catalyst, in an organic medium or without using a medium, at a temperature of from 70° to 100° C., for from 2 to 10 hours, preferably, from 5 to 8 hours, in order to provide the desired acid polybasic carboxylic ester compound.

Every esterification mixture in the two step reaction method may contain a small amount of the above-mentioned stabilizer for thermal polymerization. Especially, it is preferable that the second step esterification be carried out in the presence of the thermal polymerization stabilizer.

The catalyst for the first step esterification can be selected from dibutyl tin oxide, sulfuric acid and p-toluene sulfonic acid. The first step esterification can be effected even without using the catalyst. The catalyst for the second step esterification can be selected from p-toluene sulfonic acid, sulfuric acid and acid ion-exchange resins.

The epoxidized butadiene polymer can be modified with the acid polybasic carboxylic ester compound by any known methods. For example, the epoxidized butadiene polymer is brought into reaction with the acid polybasic carbocylic ester compound, in the presence of a catalyst consisting of the above-described organic quarternary ammonium salt usable for the single step reactin method or without using the catalyst, in an organic medium or without using the medium, at a temperature of from 50° to 100° C., for example, from 60° to 90° C., for from 3 to 20 hours, preferably, from 5 to 15 hours. By the above-mentioned reaction procedure, the cyclic epoxy radicals in the epoxidized butadiene polymer are cleaved and each addition reacted with a free carboxylic acid radical in the acid polybasic carboxylic ester compound to form a linking ester group between the epoxidized butadiene polymer backbone group and the polybasic carboxylic ester side chain group. The resultant modified epoxidized polymer contains 5 to 50, preferably, 6 to 40, polybasic carboxylic ester side chain groups per 100 butadiene units in the backbone group.

If the number of the polybasic carboxylic ester side chain groups is less than 5 per 100 butadiene units, the resultant photosetting composition will exhibit a poor photocuring rate and the photocured composition will exhibit a poor impact strength. On the other hand, if the number of the polybasic carboxylic ester side chain groups is more than 50 per 100 butadiene units, the modified epoxidized butadiene polymer will exhibit an excessively high viscosity which will cause the handling and coating operation of the resultant photosetting composition to be difficult. Also, it is very difficult to introduce more than 50 polybasic carboxylic ester side chain groups into the epoxidized butadiene polymer.

The modified, epoxidized butadiene polymer may contain 0 to 50 additional side chain groups per 100 butadiene units in the backbone group. The additional side chain groups each consist of a residue of an acid phosphoric ester compound and each is attached to the backbone group through a linking group formed by an esterifying reaction between a hydroxyl (—OH) radical attached to a phosphorus atom in the acid phosphoric ester compound and an epoxy radical in the epoxidized butadiene polymer.

The acid phosphoric ester compound usable for the present invention may be selected from the class consisting of the compounds of the formulae (II) and (III):

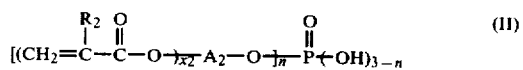

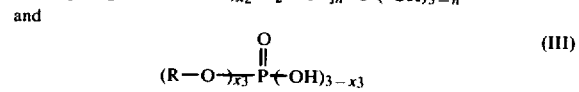

wherein $R_2$ represents a member selected from the group consisting of a hydrogen atom and methyl radical, $A_2$ represents a residue of a polyol, exclusive of the number $(x_2+1)$ of hydroxyl radicals, the subscript $x_2$ is a positive number of from 1 to 3, the subscript n is a positive number of from 1 to 2, R represents a member selected from the class consisting of alkyl radicals having 1 to 15 carbon atoms, phenyl radical and alkylphenyl radical, the alkyl radical of which has 1 to 15 carbon atoms, and the subscript $x_3$ is a positive number of from 1 to 2.

The acid phosphoric ester compounds of the formula (II) have at least one terminal group consisting of an acryloyl or methacryloyl radical and at least one free hydroxyl radical attached to the phosphorus atom in the compound. This type of compound can be prepared by any known process. For example, the compound of the formula (II) can be produced by bringing an acrylate or methacrylate compound having a hydroxyalkyl radical into reaction with phosphoryl chloride, phosphoric acid or phosphorus pentoxide. The acrylate and methacrylate compounds having a hydroxyalkyl radical usable for the above-mentioned reaction may be selected from the same class as that usable for the preparation of the acid polybasic carboxylic ester compounds described hereinbefore. Especially, 2-hydroxyethyl acrylate, 2-hydroxyethyl methacrylate, 2-hydroxypropyl acrylate, 2-hydroxypropyl methacrylate, polyethylene glycol monoacrylate, polyethylene glycol monomethacrylate, polypropylene glycol monoacrylate and polypropylene glycol monomethacrylate are useful for the preparation of the acid phosphoric ester compounds of the formula (II).

The acid phospheric ester compounds of the formula (III) can be selected from the class consisting of monoethyl phosphate, diethyl phosphate, monopropyl phosphate, dipropyl phosphate, monobutyl phosphate, dibutyl phosphate, monopentyl phosphate, monhexyl phosphate, monophenyl phosphate, mono-4-methylphenyl phosphate and mono-4-ethyl-phenyl phosphate. Especially mono- and di-alkyl phosphates having 1 to 6 carbon atoms are very useful for modifying the epoxidized butadiene polymer.

The modification of the epoxidized butadiene polymer non-modified or previously modified with the acid polybasic carboxylic ester compound with the acid phosphoric ester compound may be effected by any conventional esterification method. For example, a modified or previously modified epoxidized butadiene polymer is brought into reaction with an acid phosphoric ester compound in an organic medium or without using the medium, at a temperature of from 10° to 80° C., preferably, from 20° to 50° C., for 0.5 hours or more, preferably, from 1 to 5 hours, while the reaction mixture is stirred. During the reaction procedure, cyclic epoxy radicals in the epoxidized butadiene polymer are cleaved and each addition reacted with a hydroxyl radical attached to a phosphorus atom in the acid phosphoric ester compound, so as to form a linking group between the backbone group and the additional side chain group.

The number of the additional side chain groups in the modified, epoxidized butadiene polymer of the present invention is in a range of from 0 to 50, preferably, 5 to 50, per 100 butadiene units in the backbone group. If the number of the additional side chain groups is more than 50 per 100 butadiene units, the resultant modified, epoxidized butadiene polymer will exhibit an undesirable excessively high viscosity. Also, it is technically difficult and economically disadvantageous to prepare the modified, epoxidized butadiene polymer containing more than 50 additional side chain groups per 100 butadiene units.

In the modified, epoxidized butadiene polymer containing both the side chain and additional side chain groups, it is preferable that the sum of the numbers of the side chain and additional side chain groups be 60 or less, more preferably in a range of from 10 to 60 even more preferably, from 10 to 50, and most preferably, form 12 to 45, per 100 butadiene units. It is technically difficult to produce the modified, epoxidized butadiene polymer having a sum of the numbers of the side chain and additional side chain groups of more than 60 per 100 butadiene units. Even if such type of modified polymer could be produced, the modified polymer would cause the resultant photosetting composition to exhibit a tendency to easily gelatinize.

In the preparation of the modified, epoxidized butadiene polymer containing both the side chain and additional side chain groups, the additions of the acid polybasic carboxylic ester compound and the acid phosphoric ester compound to the epoxidized butadiene polymer are not limited to a special order. That is, first, either one of the acid polybasic carboxylic monoester compound and acid phosphoric ester compound may be added to the epoxidized butadiene polymer and, then, the other may be added to the first modified epoxidized butadiene polymer. Otherwise, the epoxidized butadiene polymer may be modified in a single step reaction with both the acid polybasic carboxylic ester compound and the acid phosphoric ester compound. However, since the acid phosphoric ester compound has a relatively low thermal stability and exhibits a relatively high addition reaction rate, it is preferable that, first, the epoxidized butadiene polymer be modified with the acid polybasic carboxylic ester compound and, then, the first modified epoxidized butadiene polymer be additionally modified with the acid phosphoric ester compound. This type of two step modification process is effective for preventing undesirable gelatinization of the resultant modified, epoxidized butadiene polymer. During the two-step modification process, almost all of the cyclic epoxy radicals in the epoxidized butadiene polymer are cleaved and addition reacted with the free carboxylic acid radicals in the acid polybasic carboxylic ester compound and, then, with the hydroxyl radicals attached to the phosphorus atom in the acid phosphoric ester compound. Therefore, the resultant modified, epoxidized butadiene polymer has an enhanced stability to storage.

In the present invention, it is preferable that the modified, epoxidized butadiene polymer contain less than 1 epoxy radical per 100 butadiene units in the backbone group.

In the case where the modified, epoxidized butadiene polymer contains 6 or more side chain groups and more than zero of additional side chain groups per 100 butadiene units, a small portion of the additional side chain groups may be replaced by another side chain group consisting of phosphoric acid, phosphorous acid or hydrochloric acid.

In the photosetting composition, it is preferable that the modified, epoxidized butadiene polymer be not gelatinized and colored, and be clear. However, the modified, epoxidized butadiene may be slightly colored. On the other hand, the modified, epoxidized butadiene polymer preferably exhibits a viscosity of from 2,000 to 100,000 cps, more preferably, from 4,000 to 60,000 cps, determined at a temperature of 30° C. by using a rotation viscometer.

The photosetting composition of the present invention contains at least one photopolymerizable monomer as an important component. The photopolymerizable monomer may be selected from photopolymerizable acrylic and methacrylic ester compounds, preferably having a boiling point of 200° C. or more under atmospheric pressure. The photopolymerizable monomer compounds may involve, for example, 2-hydroxyethyl acrylate and methacrylate, 2-hydroxypropyl acrylate and methacrylate, pentaerythritol tri-acrylate and trimethacrylate, 2-ethylhexyl acrylate and methacrylate, lauryl acrylate and methacrylate, ethylene glycol di-acrylate and di-methacrylate, diethylene di-acrylate and di-methacrylate, di-acrylic ester and di-methacrylic ester of polyethylene glycol having a degree of polymerization of from 3 to 8, propylene glycol di-acrylate and di-methacrylate, di-acrylic ester and di-methacrylic ester of polypropylene glycol having a degree of polymerization of from 2 to 6, 1,3-butylene glycol di-acrylate and di-methacrylate, 1,4-butylene glycol di-acrylate and di-methacrylate, 1,6-hexane diol di-acrylate and di-methacrylate, neopentyl glycol di-acrylate and di-methacrylate and trimethylolpropane tri-acrylate and tri-methacrylate. The photopolymerizable monomer compounds may be selected from the acid polybasic carboxylic ester compounds of the formula (I) and the acid phosphoric ester compounds of the formula (II).

The photosetting composition of the present invention contains the photopolymerizable monomer component in an amount of from 30 to 800 parts by weight, preferably, from 50 to 600 parts by weight, more preferably, from 100 to 500 parts by weight, per 100 parts by weight of the modified, epoxidized butadiene polymer. When the amount of the photopolymerizable monomer compound is less than the value of the lower limit mentioned above, the resultant photosetting composition will exhibit an undesirable high viscosity and be improper for use as a coating varnish. On the other hand, the photosetting composition containing the photopolymerizable monomer component in amount larger than the value of the upper limit described above, will cause the photocured composition to exhibit a poor impact strength.

The photosetting composition of the present invention contains, as an important component, a photosensitizer. The photosensitizer may be selected from conventional photosensitizers, for example, benzoin methyl ether, benzoin ethyl ether, benzoin isopropyl ether, benzoin butyl ether, benzoin, α-methyl benzoin, α-chlorodihydroxy benzoin, benzophenone, dimethyoxyphenyl acetophenone and benzil.

The photosetting composition of the present invention contains the photosensitizer in an amount of from 0.5 to 15 parts by weight, preferably, from 2 to 10 parts by weight, per 100 parts by weight of the modified, epoxidized butadiene polymer. When the amount of the photosensitizer used is lower than 0.5 parts by weight, an undesirable long time will be needed to complete the photocuring operation of the resultant photosetting composition. On the other hand, even if the amount of the photosensitizer is increased to more than 15 parts by weight, the photosensitivity of the resultant photosetting composition is not enhanced. That is, only an economical disadvantage results.

The photosetting composition of the present invention may contain a small amount of a thermal polymerization stabilizer, for example, selected from hydroquinone, 2,6-di-tert-butyl-p-cresol and p-benzoquinone. However, since the addition of the stabilizer causes the resultant photosetting composition to exhibit a reduced photocuring rate, the stabilizer should be used in a very small amount, that is, 5 parts by weight or less per 100 parts by weight of the photosetting composition.

The photosetting composition of the present invention can be prepared by any conventional processes. However, since the photopolymerizable monomer is not reactive in the modification reaction mixture of the epoxidized butadiene polymer with the acid polybasic carboxylic monoester compound and the acid phosphoric ester compound, it is preferable that the photopolymerizable monomer as a reaction medium be mixed with the modification reaction mixture, and after the modification of the epoxidized butadiene polymer is completed, the resultant reaction mixture which comprises the modified, epoxidized butadiene polymer and the photopolymerizable monomer, is mixed with a predetermined amount of the photosensitizer or a mixture of a predetermined amount of the photosensitizer and an additional amount of the photopolymerizable monomer.

The photosetting composition of the present invention is a transparent or semi-transparent, colorless or light yellow liquid, and has a viscosity of from 100 to 2,000 cps, preferably, 150 to 1,500 cps, determined at a temperature of 30° C. by using a rotation viscometer.

The photosetting composition is useful as a coating varnish even without using any additives. However, in order to enhance slipping property and to reduce tackiness of the coating varnish, a small amount of one or more additives, for example, a fatty acid amide, such as stearic amide and oleic amide, and wax, such as carnauba wax, ozocerite wax and spermaceti wax.

The viscosity of the photosetting composition of the present invention can be adjusted by adding the photopolymerizable monomer. However, the viscosity may be controlled by adding a small amount of styrene, vinyl toluene, vinyl acetate, methyl methacrylate, acrylic acid, methacrylic acid, benzene, toluene, xylene, cumene, hexane, cyclohexane, ethyl acetate, kerosene, methylisobutyl ketone or a mixture of two or more of the above-mentioned compounds.

Furthermore, the photosetting composition of the present invention may contain a small amount of an inorganic pigment, for example, zinc chromate, strontium chromate, iron oxide, zinc oxide, and titanium dioxide, or an organic pigment, for example, azo type, triphenylmethane type, quinoline type, anthraquinone type or phthalocyamine type pigment.

The features and advantages of the present invention will be illustrated by the following referential examples of the preparations of epoxidized butadiene polymers, acid polybasic carboxylic ester compounds and modified, epoxidized butadiene polymers, examples of the photosetting compositions of present invention and comparative examples of comparative photosetting compositions.

In the referential examples, the number of epoxy radicals in the epoxidized butadiene polymer was determined in such a manner that a predetermined amount of the epoxidized butadiene polymer was chlorinated with a hydrochloric acid-dioxane solution, and then, the amount of the non-reacted hydrochloric acid was determined by titrating alcoholic potassium in the presence of an indicator consisting of phenolphthalein.

The number of the polybasic carboxylic ester side chain groups attached to the epoxidized butadiene polymer backbone group was determined by measuring the difference in acid value of the reaction mixture of the epoxidized butadiene polymer and the acid polybasic carboxylic ester compound before the start of the reaction and after the completion of the reaction.

In the referentical examples, examples and comparative examples, the viscosities of liquid butadiene polymers, epoxidized butadiene polymers, reaction mixture containing modified, epoxidized butadiene polymers and photosetting compositions were determined at a temperature of 30° C. by using a E type rotation viscometer made by Tokyo Keiki K.K., Japan.

In the examples and comparative examples, the photocuring reaction rate of the photosetting composition was determined by the following method. A photosetting composition was applied onto a surface of a degreased aluminium plate so as to form a coating film of the photosetting composition having a thickness of 10 microns. The aluminium plate coated with the photosetting composition was placed on a conveyer belt which rotated through a horizontal path located 9 cm below a 2 KW high voltage mercury lamp 25 cm long and made by Iwasaki Denki K.K., Japan, at a predetermined velocity. The photosetting composition coating film was exposed to the ultraviolet rays from the mercury lamp and photocured. The velocity of the converyer belt was varied to several levels. After the completion of the photocuring operation, a polyvinylidene chloride film was pressed onto the surface of the photocured coating film and, then, removed therefrom. The surface of the pressed coating film was observed. The photocuring rate of the photosetting composition was expressed by a largest value of the velocity (m/min) of the conveyer belt at which no change in gloss of the surface of the coating film was observed.

The adhering intensity of the photocured coating film was determined by a cross-hatch adhesion method as follows. A photocured film adhered onto an aluminium plate or alkyd resin board was prepared by the same method as that described above. The coating film was cut in a checkerboard pattern at intervals of 2 mm so as to form 100 squares separate from each other. An adhesive sheet was adhered to the cut coating films, and then peeled off therefrom. The adhering intensity of the photocured coating film was expressed by the number of the squares remaining on the aluminium plate or the alkyd resin board.

The pencil hardness of the photocured coating film was determined in accordance with the method described in paragraph 6.14, of JIS-K 5,400.

The flexural strength of the photocured coating film was determined as follows.

A photosetting composition was applied onto a surface of a steel plate, as described in JIS-K 5,400, so as to form a coating film 30 microns thick. The coating film was photocured by using the same mercury lamp as described hereinbefore while the conveyer belt was rotated at a velocity of 1 m/min. The exposure of the coating film to the ultraviolet rays was repeated three times. The flexural strength of the photocured coating film was measured in accordance with the method described in paragraph 6.15, in JIS-K 5,400.

In the determination of impact strength of the photocured coating film, the same procedures for preparing the photocured coating film as those mentioned above were repeated, and the resultant photocured coating film was subjected to a measurment of Du Pont impact strength, in accordance with the method described in paragraph 6.13, of JIS-K 5,400.

The resistance of the photocured coating film to water was determined by applying a photosetting composition onto a surface of a glass plate to form a coating film 30 micron thick, by photocuring the coating film using the same method as mentioned above, by immersing the photocured coating film in water at a temperature of 40° C., for 1 hour, and by observing the changes in the appearance of the film surface. Especially, it was checked whether or not wrinkles and cracks were formed in the film surface, volume of the film altered and the gloss of the film surface altered.

REFERENTIAL EXAMPLE 1

(Preparations of epoxidized butadiene polymers)

Six types of epoxidized butadiene polymers were prepared from the liquid butadiene polymers each having a number average molecular weight, viscosity and molecular structure as shown in Table 1, respectively, in Experiments E-1 through E-6.

In each experiment, 500 parts by weight the liquid butadiene polymer was mixed with 1,300 parts by weight of benzene. A 30% hydrogen peroxide solution in an amount shown in Table 1 was added to the mixture. Next, formic acid in an amount shown in Table 1 was added dropwise to the resultant slurry, at a temperature of 20° C., for 30 minutes. The reaction mixture was maintained at a temperature of approximately 35° C. for 5 hours, so as to epoxidized the liquid butadiene polymer. After completion of the reaction, the reaction mixture was washed with water to remove the non-reacted hydrogen peroxide and formic acid and, then, benzene was removed from the washed reaction mixture by means of distillation.

Table 1 also shows the numbers of the epoxy radicals per 100 butadiene units, viscosities and yields of the resultant epoxidized butadiene polymers.

TABLE 1

| | Liquid butadiene polymer | | | | | Amount of 30% hydrogen peroxide solution (part by weight) | Amount of formic acid (part by weight) | Epoxidized butadiene polymer | | |
|---|---|---|---|---|---|---|---|---|---|---|
| | Content (%) | | | | | | | Number of epoxy radical per 100 butadiene units | Viscosity (cp) (at 30° C.) | Yield (part by weight) |
| Experiment No. | 1,2-structure | cis-1,4-structure | trans-1,4-structure | Number average molecular weight | Viscosity (cp) (at 30° C.) | | | | | |
| E-1 | 58 | 33 | 9 | 1270 | 500 | 700 | 28 | 8 | 1020 | 510 |
| E-2 | " | " | " | " | " | " | 50 | 12 | 2100 | 518 |
| E-3 | " | " | " | " | " | " | 83 | 19 | 5200 | 528 |
| E-4 | " | " | " | " | " | 1500 | 132 | 26 | 45600 | 536 |
| E-5 | " | " | " | " | " | 2000 | 264 | 41 | 150000 | 556 |
| E-6 | 43 | 48 | " | 2340 | 1280 | 1500 | 132 | 29 | 76000 | 542 |

REFERENTIAL EXAMPLE 2

(Preparations of acid polybasic carboxylic ester compounds)

Six types of acid polybasic carboxylic ester compounds were respectively prepared in Experiments R-1 through R-6.

EXPERIMENT R-1

(From phthalic anhydride)

A reaction mixture consisting of 98.8 g (about 0.67 moles) of phthalic anhydride, 116 g (about 1.0 moles) of 2-hydroxyethyl acrylate, 0.3 g of 2,6-di-tert-butyl-p-cresol and 0.45 g of triethylbenzyl ammonium chloride, was subjected to an esterification reaction at a temperature of 95° C. for 8 hours while the mixture is stirred. Next, the non-reacted 2-hydroxyethyl acrylate was removed by means of distillation. 181 g of a viscous liquid acid phthalic monoester compound, which exhibited no peaks in the frequencies of 1,770 cm$^{-1}$ and 1,850 cm$^{-1}$ in the infra-red ray spectrum, were obtained. The resultant compound had an acid value of 208 and a viscosity of 15,000 cps at 30° C.

EXPERIMENT R-2

(From phthalic anhydride)

The same procedures as those described in Experiment R-1 were repeated, except that the esterification reaction was carried out for 5 hours. 162 g of the resultant viscous liquid acid phthalic monoester compound, which exhibited no peaks in frequencies of 1,770 cm$^{-1}$ and 1,850 cm$^{-1}$ in the infra-red ray spectrum, were obtained. The resultant compound exhibited an acid value of 215 and a viscosity of 16,000 cps at 30° C.

EXPERIMENT R-3

(From 2,3,3',4-biphenyltetracarboxylic dianhydride)

A reaction mixture containing 250 g (about 0.85 moles) of 2,3,3',4'-biphenyltetracarboxylic dianhydride, 390 g (about 3.4 moles) of 2-hydroxyethyl acrylate, 0.77 g of benzyltriethyl ammonium chloride (catalyst) and 0.57 g of 2,6-di-tert-butyl-p-cresol, was subjected to an esterification reaction, at a temperature of about 80° C., for 7 hours, while air was flowed through the mixture. Next, the non-reacted 2-hydroxyethyl acrylate was eliminated by way of distillation under a reduced pressure. About 467 g of the resultant acid biphenyl tetracarboxylic diester compound were obtained. The resultant compound exhibited an acid value of 204 and a viscosity of 23,000 cps at 50° C. The compound contained approximately two carboxyl radical per molecule.

EXPERIMENT R-4

(From trimellitic anhydride)

The same procedures as those mentioned in Experiment R-1 were repeated, except that the phthalic anhydride was replaced by 129 g (about 0.67 moles) of trimellitic anhydride. 198 g of the resultant acid trimellitic monoester compound, which exhibited no peaks at 1,770 cm$^{-1}$ and 1,850 cm$^{-1}$, were obtained. The compound exhibited an acid value of 345 and a viscosity of 21,000 cps at 30° C., and contained about two carboxyl radical per molecule.

EXPERIMENT R-5

(From tetrahydrophthalic anhydride)

The same procedures as those described in Experiment R-1 were carried out, except that the phthalic anhydride was replaced by 102 g (about 0.67 moles) of tetrahydrophthalic anhydride, and the reaction temperature was about 95° C. 184 g of acid tetrahydrophthalic monoester compound were obtained. The compound exhibited no peaks at 1,770 cm$^{-1}$ and 1,850 cm$^{-1}$, and had an acid value of 204 and a viscosity of 16,000 cps at 30° C.

EXPERIMENT R-6

(From 4-nitrophthalic anhydride)

Procedures identical to those used in Experiment R-1 were carried out, except that the phthalic anhydride was replaced by 129 g (about 0.67 moles) of 4-nitrophthalic anhydride. 186 g of acid 4-nitrophthalic monoester compound were obtained. The compounds exhibited no peaks at 1,770 cm$^{-1}$ and 1,850 cm$^{-1}$, and had an acid value of 175 and a viscosity of 37,000 cps at 30° C.

REFERENTIAL EXAMPLE 3

(Preparations of modified, epoxidized butadiene polymers)

Eight types of modified, epoxidized butadiene polymers were prepared in Experiment M-1 through M-8 by modifying epoxidized butadiene polymers with acid polybasic carboxylic ester compounds only.

In each of Experiments M-1 through M-8, a reaction mixture containing 280 parts by weight of benzene, 142 parts by weight of an epoxidized butadiene polymer shown in Table 2, a type and amount of acid polybasic carboxylic ester compound respectively indicated in Table 2, 0.8 parts by weight of 2,6-di-tert-butyl-p-cresol and 0.8 parts by weight of triethylbenzylammonium chloride, was subjected to a modification reaction at a temperature of 75° C., for 8 hours, except that in Experiment M-3, the reaction time was 4 hours. After the reaction was completed, the benzene was removed from the reaction mixture by way of distillation under a reduced pressure. The obtained liquid contained a modified, epoxidized butadiene polymer, non-reacted acid polybasic carboxylic ester compound. The compositions and viscosities of the liquids obtained in Experiments M-1 through M-8 are shown in Table 2.

TABLE 2

| | Modification process Component | | | Product Component | | | | |
|---|---|---|---|---|---|---|---|---|
| | | Acid polybasic carboxylic ester compound | | Modified, epoxidized butadiene polymer | | Non-reacted acid polybasic carbonylic ester compound | | |
| Experiment No. | Type of epoxidized butadiene polymer | Type of compound | Amount (part by weight) | Number of side chain group per 100 butadiene units | Amount (part by weight) | Type of compound | Amount (part by weight) | Viscosity (cp) |
| M-1 | E-1 | PHEA | 53 | 4 | 164 | PHEA | 25 | 3500 |
| M-2 | E-2 | " | 135 | 8 | 197 | " | 80 | 5500 |
| M-3 | E-3 | " | 177 | 7 | 188 | " | 130 | 5000 |
| M-4 | E-3 | " | 177 | 10 | 212 | " | 106 | 12000 |
| M-5 | E-3 | THEA | 210 | 11 | 232 | THEA | 120 | 25000 |
| M-6 | E-3 | NHEA | 211 | 10 | 225 | NHEA | 128 | 35000 |
| M-7 | E-4 | PHEA | 281 | 15 | 242 | PHEA | 181 | 45000 |
| M-8 | E-5 | " | 199 | 18 | 217 | " | 110 | 22000 |

Note:
PHEA - reaction product of phthalic anhydride with 2-hydroxyethyl acrylate (Experiment R-1)
THEA - reaction product of trimellitic anhydride with 2-hydroxyethyl acrylate (Experiment R-4)
NHEA - reaction product of 4-nitrophthalic anhydride with 2-hydroxyethyl acrylate (Experiment R-6)

The modified, epoxidized butadiene polymer obtained in Experiment M-1 is useless for the photosetting composition of the present invention, because only 4 side chain groups per 100 butadiene units were attached mixture was subjected to a second modification process at a temperature of 40° C. for 3 hours while stirring.

Table 2 shows compositions and viscosities of the resultant liquids of Experiments M-9 through M-19.

TABLE 3

| | Modification Component | | | Product Composition | | | | | | |
|---|---|---|---|---|---|---|---|---|---|---|
| | Epoxidized butadiene polymer | Acid polybasic carboxylic ester compound | | Amount of acid phosphoric ester compound (g) | Modified, epoxidized butadiene polymer | | | Non-reacted polybasic carboxylic compound | | A-mount of 2-HEA | Viscosity (cp) |
| | | | | | Number of groups per 100 butadiene units | | | | | | |
| Experiment No. | Type | Amount (g) | Type | Amount (g) | | side chain group | Additional side chain group | Amount (g) | Type of compound | Amount (g) | | |
| M-9 | E-1 | 20 | PHEA | 7.8 | 4.7 | 0.04 | 0.04 | 28.6 | PHEA | 3.9 | 60 | 2800 |
| M-10 | E-2 | 20 | " | 11.7 | 8.2 | 0.05 | 0.07 | 33.1 | " | 6.8 | " | 3000 |
| M-11 | E-3 | 20 | " | 18.5 | 22.4 | 0.08 | 0.19 | 50.1 | " | 10.7 | 60 | 3200 |
| M-12 | E-4 | 20 | " | 25.4 | 23.8 | 0.05 | 0.21 | 48.5 | " | 20.7 | 60 | 2700 |
| M-13 | E-4 | 20 | " | 25.4 | 18.8 | 0.10 | 0.16 | 64.6 | " | 15.6 | 60 | 3400 |
| M-14 | E-4 | 20 | " | 25.4 | 8.2* | 0.10 | 0.16 | 37.9 | " | 15.6 | 60 | 3100 |
| M-15 | E-5 | 20 | " | 39.9 | 30.6 | 0.15 | 0.26 | 65.2 | " | 25.3 | 60 | 5300 |
| M-16 | E-6 | 20 | " | 28.3 | 20.4 | 0.10 | 0.19 | 51.8 | " | 16.9 | 60 | 4500 |
| M-17 | E-4 | 20 | BHEA | 50.5 | 15.3 | 0.13 | 0.13 | 60.8 | BHEA | 25.0 | 60 | 6100 |
| M-18 | E-4 | 20 | THEA | 29.6 | 17.7 | 0.11 | 0.15 | 50.2 | THEA | 17.1 | 60 | 4300 |
| M-19 | E-4 | 20 | TPHEA | 25.8 | 16.5 | 0.12 | 0.14 | 48.2 | TPHEA | 14.1 | 60 | 3200 |

Note:
BHEA - reaction product 2,3,3',4'-biphenyltetracarboxylic dianhydride with 2-hydroxyethyl acrylate (Experiment R-3)
TPHEA - reaction product of tetrahydrophthalic anhydride with 2-hydroethyl acrylate (Experiment R-5)
2-HEA - 2-hydroxyethyl acrylate
*- acid butyl phosphoric monoester to the epoxidized butadiene polymer backbone group.

In Experiments M-9 through M-19, modified, epoxidized butadiene polymers containing not only polybasic carboxylic ester side chain groups but also phosphoric ester additional side chain groups were produced.

In each of Experiments M-9 through M-19, a first reaction mixture comprising a type and amount of an epoxidized butadiene polymer, and a type and amount of an acid polybasic carboxylic ester compound, respectively indicated in Table 4, 60 g of 2-hydroxyethyl acrylate as a medium, 0.4 g of triethylbenzyl ammonium chloride as a catalyst, and 0.8 g of 2,6 -di-tert-butyl-p-cresol as an antigelatinizing agent, was brought into a first modification process at a temperature of 85° C., for 8 hours, except that in Experiment M-13, the reaction time was 4 hours. After the modification process was completed, the reaction mixture was cooled to atmospheric temperature.

Next, the cooled first reaction mixture was mixed with the amount shown in Table 3 of acid phosphoric dimethacrylate, except that in Experiments M-14, 8.2 g of acid butyl phosphoric monoester was used, to prepare a second reaction mixture. The second reaction The modified, esterified butadiene polymer obtained by Experiment M-9 is useless for the photosetting composition of the present invention, because the number of the polybasic carboxylic ester side chain groups falls outside of the scope of the present invention.

EXAMPLES 1 THROUGH 8

In each of Examples 1 through 8, a photosetting composition was prepared by mixing the type and amount of a modified, epoxidized butadiene polymer and the type and amount of a photopolymerizable monomer, respectively shown in Table 4, and 5 parts by weight of benzoin methyl ether per 100 parts by weight of the sum of the modified, epoxidized butadiene polymer and the photopolymerizable monomer.

The viscosities, photocuring rates and stabilities for storage of the photosetting compositions of Examples 1 through 8, and the pencil hardnesses, adhering intensities, flexural strengths, Du Pont impact strengths and resistances to water of the photocured compositions are indicated in Table 4. The stability for storage of the photosetting composition was expressed in terms of viscosity of the photosetting composition determined at a temperature of 30° C., after the composition was stored at a temperature of 30° C. for 90 days.

TABLE 4

| | Photosetting composition | | | | | | Photocured composition | | | | |
|---|---|---|---|---|---|---|---|---|---|---|---|
| | Composition | | | | | | | | | | |
| | Modification reaction product (containing modified, epoxidized butadiene polymer) | | Photopolymerizable monomer | | | | Stability for storage (viscosity after 90 day store) (cp) | | | | |
| Example No. | Type | Amount (part by weight) | Type | Amount (part by weight) | Viscosity (cp) | Photo-curing rate (m/min) | | Pencil hardness | Adhering intensity (%) | Flexural strength (mmφ) | Du pont impact strength (500g × 1/2" × cm) | Resistance to water |
| 1 | M-2 | 141 | 2-HEA | 100 | 360 | 25 | 375 | H | 100 | 2 | 120 | excellent |
| 2 | M-3 | 170 | 2-HEA | 100 | 350 | 27.5 | 360 | H | 100 | 2 | 110 | " |

TABLE 4-continued

| | Photosetting composition | | | | | | | Photocured composition | | | | |
|---|---|---|---|---|---|---|---|---|---|---|---|---|
| | Composition | | | | | | | | | | | |
| | Modification reaction product (containing modified, epoxidized butadiene polymer) | | Photopolymerizable monomer | | | | Stability for storage (viscosity after 90 day store) (cp) | | | | Du pont impact strength (500g × ¼" × cm) | |
| Example No. | Type | Amount (part by weight) | Type | Amount (part by weight) | Viscosity (cp) | Photocuring rate (m/min) | | Pencil hardness | Adhering intensity (%) | Flexural strength (mmφ) | | Resistance to water |
| 3 | M-4 | 151 | 2-HEA | 100 | 450 | 30 | 470 | H | 100 | 2 | 150 | '' |
| 4 | M-4 | 151 | 1,6-HDA | 100 | 450 | 25 | 465 | H | 100 | 2 | 120 | '' |
| 5 | M-5 | 155 | 2-HEA | 100 | 760 | 30 | 790 | H | 100 | 2 | 110 | '' |
| 6 | M-6 | 157 | 2-HEA | 100 | 470 | 25 | 480 | H | 100 | 2 | 120 | '' |
| 7 | M-7 | 175 | 2-HEA | 100 | 1100 | 40 | 1150 | H | 100 | 2 | 150 | '' |
| 8 | M-8 | 155 | 2-HEA | 100 | 630 | 40 | 660 | H | 100 | 2 | 140 | '' |

Note:
1,6-HDA - 1,6-hexanediol diacrylate

COMPARATIVE EXAMPLE 1

Procedures identical to those described in Example 1 were carried out, except that 146 parts by weight of the modification reaction product of Experiment M-1 was used instead of that of Experiment M-2.

The resultant comparative photosetting composition exhibited a relatively low viscosity of 250 cps at 30° C. and a very low photocuring rate of 10 m/min in terms of the rotation velocity of conveyor belt. Also, the photocured comparative composition exhibited a relatively low pencil hardness of HB, a low adhering intensity of 80%, a flexural strength of 2 mm φ and a poor Du Pont impact strength of 80 (500 g×½"xcm). Also, as a result of the test of the resistance to water, a number of wrinkles and cracks were created on the surface of the coating film, the coating film was swollen and the gloss of the coating film surface was remarkably reduced.

COMPARATIVE EXAMPLE 2

A liquid polybudiene having a number average molecular weight of 1530, a viscosity of 800 cps at 30° C. and containing 54% of 1,2 structure, 37% of cis-1,4 structure and 9% of trans-1,4 structure, was epoxidized by the same method as that described in Experiment E-1. The resultant epoxidized polybutadiene contained 6 epoxy radicals per 100 butadiene units. 100 parts by weight of the epoxidized polybutadiene were mixed with 12 parts by weight of methacrylic acid, 0.1 parts by weight of hydroquinone and 200 parts by weight of benzene. The resulting reaction mixture was subjected to a modification process at a temperature of 60° C. for 3 hours. After the completion of the modification process, the benzene and the non-reacted methacrylic acid were removed from the reaction mixture by applying a process of distillation under a reduced pressure. 105 parts by weight of the modification product were obtained.

A comparative photosetting composition was prepared by mixing 100 parts by weight of the above modification product, 10 parts by weight of 1,3-butylene glycol diacrylate and 1 part by weight of benzil. The composition had a viscosity of 400 cps at 30° C. and exhibited such a very poor photocuring rate that, even at a rotating velocity of the conveyor belt of 5 m/min., the composition did not harden.

COMPARATIVE EXAMPLE 3

A polybasic carboxylic ester compound was prepared by bringing a mixture of 58 parts by weight of 2-hydroxyethyl acrylate, 74 parts by weight of phthalic anhydride, 2 parts by weight of triethylbenzyl ammonium chloride, 0.1 part of hydroquinone and 0.1 part of anthraquinone into a reaction process at a temperature of 110° C. for 5 hours. 132 parts by weight of the above-obtained ester compound were mixed with 95 parts by weight of an epoxy resin (of the trademark DER-331J, made by Dow Chemical Co. and having an epoxy equivalent of 190) and (7 parts by weight of trialkyl isocyanate. The mixture was heated at a temperature of from 100° to 120° C. for 3 hours, to prepare a varnish.

A comparative photosetting composition was provided by mixing 7.8 parts by weight of the above-prepared varnish with 2 parts by weight of trimethylolpropane triacrylate and 0.2 parts of benzoinethyl ether. The composition had a viscosity of 1500 cps at 30° C. and a poor photocuring rate of 7.5 m/min, in terms of the rotating velocity of the conveyer belt. Also, when photocured, the resultant hardened coating film exhibited a pencil hardness of 2H, a very poor adhering intensity of 0, a very poor flexural strength of 4 mm φ and a very poor Du pont impact strength of 5 or less (500 gx½"xcm). However, the photocured coating film exhibited a relatively high resistance to water.

EXAMPLES 9 THROUGH 18

In each of Examples 9 through 18, a photosetting composition was prepared by mixing the type and amount of a modification reaction product containing a modified, epoxidized butadiene polymer, and the type and amount of acid polybasic carboxylic ester compound, respectively shown in Table 5, and the amounts of 2-hydroxyethyl acrylate, pentaerythritol triacrylate and benzoin methyl ether respectively indicated in Table 5.

The viscosities, photocuring rates and stabilities for storage of the photosetting compositions of Examples 9 through 18, and pencil hardnesses, adhering intensities, flexural strengths and Dupont impact strengths of the photocured compositions are indicated in Table 6.

COMPARATIVE EXAMPLE 4

Procedures identical to those described in Example 9 were carried out, except that the modification reaction product of Experiment M-9 was used in place of that of Experiment M-10, and the acid polybasic carboxylic ester compound, the 2-hydroxyethyl acrylate, the pentaerythritol triacrylate and the benzoinmethyl ether were used, respectively, in the amounts indicated in Table 5.

The results of Comparative Example 4 are also shown in Table 6.

radicals, $R_o$ represents a residue of a member selected from the group consisting of aromatic and cycloaliphatic polybasic carboxylic acids, which residue is exclusive of the number (m+a) of carboxyl radicals, the subscript $x_1$ is a positive number from 1 to 3, the subscript m is a positive number from 1 to 3 and the subscript a is a positive number from 1 to 3, and each of which side chain groups is

TABLE 5

| | Photosetting Composition | | | | | |
|---|---|---|---|---|---|---|
| | Photopolymerizable monomer | | | | | |
| | Modified, epoxidized polybutadiene | | Acid polybasic carboxylic ester compound | | Amount of 2-HEA (part by weight) | Amount of PETA (part by weight) | Photosensitizer Amount of benzoinmethyl ether (part by weight) |
| Example No. | Type | Amount (part by weight) | Type | Amount (part by weight) | | | |
| Comparative Example 4 | M-9 | 100 | PHEA | 13.6 | 130 | 20 | 13.2 |
| Example 9 | M-10 | 100 | PHEA | 20.5 | 150 | 20 | 14.5 |
| Example 10 | M-11 | 100 | PHEA | 21.3 | 180 | 20 | 16.1 |
| Example 11 | M-12 | 100 | PHEA | 42.7 | 180 | 20 | 17.1 |
| Example 12 | M-13 | 100 | PHEA | 24.2 | 200 | 20 | 17.2 |
| Example 13 | M-14 | 100 | PHEA | 41.1 | 150 | 20 | 15.6 |
| Example 14 | M-15 | 100 | PHEA | 38.8 | 400 | 20 | 27.9 |
| Example 15 | M-16 | 100 | PHEA | 32.6 | 380 | 20 | 26.6 |
| Example 16 | M-17 | 100 | BHEA | 36.7 | 400 | 20 | 27.8 |
| Example 17 | M-18 | 100 | THEA | 34.1 | 380 | 20 | 26.7 |
| Example 18 | M-19 | 100 | TPHEA | 29.2 | 180 | 20 | 16.5 |

Note:
PETA - pentaerythritol triacrylate

TABLE 6

| | Property of photosetting composition | | | Property of Photocured coating film | | | | | |
|---|---|---|---|---|---|---|---|---|---|
| | | | Stability for storage (viscosity after 90 day store) (cp) | Pencil hardness | Adhering intensity to | | | Flexural strength (mmφ) | Dupont impact strength (500g × ¼" × cm) | Resistance to water |
| Example No. | Viscosity (cp) | Photocuring rate (m/min) | | | Tinplate (%) | Aluminium plate (%) | Alkyd resin board (%) | | | |
| Comparative Example 4 | 210 | 10 | 213 | HB | 90 | 100 | 100 | 2 | 90 | poor |
| Example 9 | 210 | 30 | 215 | H | 100 | 100 | 100 | 2 | 130 | excellent |
| Example 10 | 215 | 35 | 218 | 2H | 100 | 100 | 100 | 2 | 135 | excellent |
| Example 11 | 235 | 30 | 238 | 2H | 100 | 100 | 100 | 2 | 135 | excellent |
| Example 12 | 230 | 40 | 237 | 2H | 100 | 100 | 100 | 2 | 140 | excellent |
| Example 13 | 220 | 30 | 227 | 2H | 100 | 100 | 100 | 2 | 135 | excellent |
| Example 14 | 250 | 45 | 255 | 2H | 100 | 100 | 100 | 2 | 130 | excellent |
| Example 15 | 260 | 40 | 269 | 2H | 100 | 100 | 100 | 2 | 140 | excellent |
| Example 16 | 290 | 50 | 303 | 2H | 100 | 100 | 100 | 2 | 110 | excellent |
| Example 17 | 270 | 40 | 275 | 2H | 100 | 100 | 100 | 2 | 105 | excellent |
| Example 18 | 210 | 30 | 213 | 2H | 100 | 100 | 100 | 2 | 130 | excellent |

What we claim is:

1. A photosetting composition comprising:
(A) 100 parts by weight of a modified, epoxidized butadiene polymer which comprises (1) a backbone group consisting of a residue of an epoxidized butadiene polymer, (2) 5 to 50 side chain groups per 100 butadiene units in said backbone group, each of which side chain group comprises a residue of a member selected from acid aromatic and cycloaliphatic polybasic carboxylic ester compounds of the formula (I):

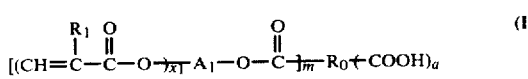

wherein $R_1$ represents a member selected from the group consisting of a hydrogen atom and a methyl radical, $A_1$ represents a residue of a polyol compound exclusive of the number $(x_1+1)$ of hydroxyl radicals, $R_o$ represents a residue of a member selected from the group consisting of aromatic and cycloaliphatic polybasic carboxylic acids, which residue is exclusive of the number (m+a) of carboxyl radicals, the subscript $x_1$ is a positive number from 1 to 3, the subscript m is a positive number from 1 to 3 and the subscript a is a positive number from 1 to 3, and each of which side chain groups is attached to said backbone group through a linking group formed by an esterifying reaction between a carboxylic acid radical in said polybasic carboxylic ester and an epoxy radical in said epoxidized butadiene polymer, and (3) 5 to 50 additional side chain groups per 100 butadiene units in said backbone group, each of which additional side chain groups comprises a residue of an acid phosphoric ester compound of the formulae (II) and (III):

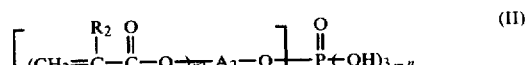

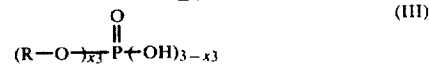

wherein $R_2$ represents a member selected from the group consisting of a hydrogen atom and methyl radical, $A_2$ represents a residue of a polyol compound exclusive of the number $(x_2+1)$ of hydroxyl radicals, the subscript $x_2$ is a positive number from 1 to 3, the subscript n is a positive number from 1 to 2, R represents a member selected from the group consisting of alkyl radicals having 1 to 15 carbon atoms, phenyl radicals and alkylphenyl radicals, the alkyl radical of which has 1 to 15 carbon atoms, and the subscript $x_3$ is a positive number from 1 to 2, and each of which additional side chain group is attached to said backbone group through a linking group formed by an esterifying reaction between a hydroxyl (—OH) radical attached to a phosphorus atom in said acid phosphoric ester compound and an epoxy radical in said epoxidized butadiene polymer, the sum in number of said side chain groups and said additional side chain groups in said modified epoxidized butadiene polymer being in a range of from 10 to 60 per 100 butadiene units;

(B) 30 to 800 parts by weight of at least one photopolymerizable monomer, and;

(C) 0.5 to 15 parts by weight of a photosensitizer.

2. A photosetting composition as claimed in claim 1, wherein said epoxidized butadiene polymer is one prepared by epoxidizing a liquid butadiene polymer having a number average molecular weight of from 500 to 5000.

3. A photosetting composition as claimed in claim 2, wherein said liquid butadiene polymer has a viscosity of from 20 to 10,000 cps at a temperature of 30° C.

4. A photosetting composition as claimed in claim 2, wherein 40% or more of said butadiene units in said liquid butadiene polymer have a 1,4-structure.

5. A photosetting composition as claimed in claim 2, wherein said liquid butadiene polymer is selected from the class consisting of butadiene homopolymers and butadiene copolymers containing at least 70% in molar amount of butadiene.

6. A photosetting composition as claimed in claim 1, wherein said epoxidized butadiene polymer contains at least 7 epoxy radicals per 100 butadiene units therein.

7. A photosetting composition as claimed in claim 6, wherein the number of said epoxy radicals is in a range of from 10 to 80, per 100 butadiene units in said epoxidized butadiene polymer.

8. A photosetting composition as claimed in claim 7, wherein the number of said epoxy radicals is in a range of from 12 to 60, per 100 butadiene units in said epoxidized butadiene polymer.

9. A photosetting composition as claimed in claim 1, wherein the number of said polybasic carboxylic ester side chain groups in said modified, epoxidized butadiene polymer corresponds to 75% or less of that said epoxy radicals in said epoxidized butadiene polymer.

10. A photosetting composition as claimed in claim 1, wherein said photopolymerizable comonomer is selected from the class consisting of acrylic and methacrylic esters having a boiling point of 200° C. or more.

11. A photosetting composition as claimed in claim 1, wherein said modified, epoxidized butadiene polymer has a viscosity of from 2,000 to 100,000 cps at a temperature 30° C.

12. A photosetting composition as claimed in claim 1, wherein said modified, epoxidized butadiene polymer contains less than 1 epoxy radical per 100 butadiene units.

* * * * *